(12) United States Patent
Wu et al.

(10) Patent No.: US 11,618,008 B2
(45) Date of Patent: Apr. 4, 2023

(54) PRECIOUS GROUP METAL ON PYROCHLORE-PHASE CERIA ZIRCONIA WITH SUPERIOR OXYGEN STORAGE CAPACITY AND TWC PERFORMANCE

(71) Applicant: Ford Global Technologies, LLC, Dearborn, MI (US)

(72) Inventors: Jason Wu, Birmingham, MI (US); Giovanni Cavataio, Dearborn, MI (US); Ann O'Neill, Dearborn, MI (US); Natalie Roxas, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 17/063,324

(22) Filed: Oct. 5, 2020

(65) Prior Publication Data
US 2022/0105492 A1    Apr. 7, 2022

(51) Int. Cl.
| | | |
|---|---|---|
| *B01J 21/06* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |

(Continued)

(52) U.S. Cl.
CPC ............ *B01J 23/10* (2013.01); *B01D 53/945* (2013.01); *B01J 23/42* (2013.01); *B01J 23/44* (2013.01); *B01J 23/464* (2013.01); *B01J 23/468* (2013.01); *B01J 23/52* (2013.01); *B01J 23/755* (2013.01); *B01J 37/0205* (2013.01); *B01J 37/0228* (2013.01); *B01J 37/0248* (2013.01); *B01J 37/088* (2013.01); *B01J 37/16* (2013.01); *B01D 2255/106* (2013.01); *B01D 2255/1021* (2013.01); *B01D 2255/1023* (2013.01); *B01D 2255/1025* (2013.01); *B01D 2255/1028* (2013.01); *B01D 2255/407* (2013.01); *B01D 2255/908* (2013.01)

(58) Field of Classification Search
CPC . B01J 21/066; B01J 23/10; B01J 23/42; B01J 23/44; B01J 23/464; B01J 23/468; B01J 23/52; B01J 23/755; B01J 37/0205; B01J 37/0228; B01J 37/0248; B01J 37/088; B01J 37/16; B01D 53/945
See application file for complete search history.

(56) References Cited

U.S. PATENT DOCUMENTS

| | | | | |
|---|---|---|---|---|
| 7,214,643 | B2 * | 5/2007 | Yamamoto | ............ C01G 25/00 423/594.2 |
| 7,247,597 | B2 * | 7/2007 | Morikawa | ................ B01J 23/63 423/594.12 |

(Continued)

FOREIGN PATENT DOCUMENTS

| | | |
|---|---|---|
| JP | 5127380 | 1/2013 |
| JP | 6042185 | 12/2016 |

*Primary Examiner* — Cam N. Nguyen
(74) *Attorney, Agent, or Firm* — Burris Law, PLLC

(57) ABSTRACT

Methods for preparing ceria-zirconia (CZO) materials calcined with precious group metals (PGM) include calcining a CZO material with PGM. The calcined CZO/PGM catalyst is reduced at a temperature of ≥1000° C. to ≤1100° C. for a time of ≥0.5 hour to 1 hour to form a (CZO/PGM)-pyrochlore catalyst. The (CZO/PGM)-pyrochlore catalyst exhibits superior oxygen storage capacity characteristics as a three-way catalyst in vehicle exhaust gas systems.

15 Claims, 7 Drawing Sheets

(51) Int. Cl.
  *B01J 23/52* (2006.01)
  *B01J 23/755* (2006.01)
  *B01J 37/02* (2006.01)
  *B01J 37/08* (2006.01)
  *B01J 37/16* (2006.01)
  *B01D 53/94* (2006.01)

(56) References Cited

U.S. PATENT DOCUMENTS

| | | | | |
|---|---|---|---|---|
| 7,871,956 B2* | 1/2011 | Wakita | ............. | B01J 23/63 423/594.12 |
| 8,187,995 B2* | 5/2012 | Wakita | ............. | B01J 37/0036 502/304 |
| 8,202,819 B2* | 6/2012 | Kohara | ............. | B01J 23/10 502/304 |
| 8,697,600 B2* | 4/2014 | Nobukawa | ............. | B01J 23/63 502/355 |
| 8,853,120 B2* | 10/2014 | Aoki | ............. | B01J 35/0006 502/527.12 |
| 9,308,516 B2* | 4/2016 | Houshito | ............. | B01J 37/0248 |
| 9,539,542 B2* | 1/2017 | Mikita | ............. | B01J 21/066 |
| 9,579,633 B2* | 2/2017 | Suzuki | ............. | B01D 53/9468 |
| 9,707,543 B2 | 7/2017 | Asanuma et al. | | |
| 9,839,902 B2* | 12/2017 | Suzuki | ............. | B01J 37/0244 |
| 9,868,087 B2* | 1/2018 | Kumatani | ............. | B01J 37/0036 |
| 10,046,308 B2 | 8/2018 | Minami et al. | | |
| 10,058,846 B2* | 8/2018 | Saito | ............. | B01J 35/0006 |
| 10,112,180 B2 | 10/2018 | Morikawa et al. | | |
| 10,143,968 B2* | 12/2018 | Suzuki | ............. | B01J 35/0006 |
| 10,556,223 B2* | 2/2020 | Suzuki | ............. | B01J 37/031 |
| 10,625,243 B2* | 4/2020 | Clowes | ............. | B01J 35/04 |
| 2003/0050189 A1* | 3/2003 | Morikawa | ............. | B01J 37/03 502/304 |
| 2011/0274603 A1* | 11/2011 | Kohara | ............. | B01J 23/63 422/177 |
| 2012/0021899 A1* | 1/2012 | Nobukawa | ............. | B01J 23/63 502/332 |
| 2013/0143732 A1* | 6/2013 | Aoki | ............. | B01D 53/9445 502/304 |
| 2014/0037524 A1* | 2/2014 | Mikita | ............. | B01J 21/066 423/213.2 |
| 2015/0209760 A1* | 7/2015 | Asanuma | ............. | B01J 23/10 502/439 |
| 2016/0184801 A1* | 6/2016 | Morikawa | ............. | B01J 23/002 502/304 |
| 2016/0288100 A1* | 10/2016 | Goto | ............. | B01J 23/002 |
| 2018/0021758 A1* | 1/2018 | Kumatani | ............. | B01J 23/63 502/154 |
| 2018/0065111 A1* | 3/2018 | Saito | ............. | B01J 20/0211 |
| 2019/0126248 A1* | 5/2019 | Chinzei | ............. | B01J 37/0244 |
| 2021/0299637 A1* | 9/2021 | Kobayashi | ............. | B01J 23/83 |
| 2021/0355851 A1* | 11/2021 | Aihara | ............. | B01D 53/94 |

* cited by examiner

PRECIOUS GROUP METAL ON PYROCHLORE-PHASE CERIA ZIRCONIA WITH SUPERIOR OXYGEN STORAGE CAPACITY AND TWC PERFORMANCE

FIELD

The present disclosure relates to oxygen storage capacity materials.

BACKGROUND

The statements in this section merely provide background information related to the present disclosure and may not constitute prior art.

During the combustion process in combustion engines, gasoline is oxidized and hydrogen and carbon combine with air, forming exhaust gas. The formed exhaust gas includes carbon dioxide, carbon monoxide, nitrogen oxides, hydrocarbons, and water.

Automobile exhaust systems include a three-way catalytic converter to assist with oxidizing the formed carbon monoxide, hydrocarbons, and nitrogen oxides gases into carbon dioxide, nitrogen, and water. Such automobile exhaust systems are periodically monitored for proper conversion capability. Typical monitoring methods include monitoring the air-to-fuel (A/F) ratio with at least an oxygen sensor. The oxygen sensor detects the oxygen concentration in a fuel supply line for determining the A/F ratio. The A/F ratio is maintained as close to a stoichiometrically balanced composition as possible so that the concentrations of oxidizing gases, namely, nitrogen oxides and oxygen, balance against the concentrations of reducing gases, namely, hydrocarbons and carbon monoxide. In theory, when the A/F ratio is stoichiometrically balanced, it should be possible to produce only carbon dioxide, water, and nitrogen exhaust. Otherwise, when the A/F is too fuel rich, a purification rate of nitrogen oxides increases but the purification rate of hydrocarbons and carbon monoxide decreases. Similarly, when the A/F is too air rich, the purification rate of nitrogen oxides decreases and the purification rate of hydrocarbons and carbon monoxide increases.

The A/F ratio may be stoichiometrically balanced with an oxygen storage capacity (OSC) material. The OSC material absorbs oxygen when the oxygen concentration in exhaust gas is high and releases oxygen when the oxygen concentration of the exhaust gas is low.

One form of an OSC material is a ceria-zirconia material in the tetragonal phase with precious group metal impregnated thereon. Such materials used as exhaust-gas-purification catalysts are limited to OSC maximums of about 50% to about 60% of a theoretical maximum available OSC, where the theoretical maximum available OSC is defined as all of the cerium ions within the calcinated, impregnated ceria-zirconia support being reduced from $Ce^{4+}$ to $Ce^{3+}$.

U.S. Pat. No. 9,707,543 discloses an exhaust-gas-purification catalyst. The catalyst is formed by heating a ceria-zirconia support under a reducing environment at up to about 1200° C. to increase its surface area. Subsequently, the ceria-zirconia support is impregnated with a precious group metal by adding an aqueous precious group metal nitrate solution with the ceria-zirconia support, followed by calcinating the impregnated ceria-zirconia support at 600° C. Exhaust-gas-purification catalysts produced under this method are limited to OSC maximums of about 70%-90% of a theoretical maximum available OSC.

These issues related to achieving proper A/F ratios with OSC materials are addressed by the present disclosure.

SUMMARY

This section provides a general summary of the disclosure and is not a comprehensive disclosure of its full scope or all of its features.

According to one form of the present disclosure, a method for producing a catalyst formed of ceria-zirconia (CZO) in the pyrochlore phase impregnated with at least a precious group metal (PGM) includes calcining the CZO with the PGM to form a calcined CZO PGM catalyst. The calcined CZO PGM catalyst is reduced to form a (PGM/CZO)-pyrochlore catalyst, and the (PGM/CZO)-pyrochlore catalyst is coated onto a substrate.

In a variation, the substrate is cordierite.

In another variation, reducing the calcined CZO PGM catalyst includes heating the calcined CZO PGM catalyst in an environment held at a temperature of about 1050° C. for greater than or equal to about 0.5 hour to less than or equal to about 1 hour.

In yet another variation, the PGM is palladium and the CZO is calcined with the palladium at about 0.6 wt. %.

In a further variation, the PGM is at about less than or equal to about 1 wt. %.

In a further still variation, reducing the calcined ceria-zirconia includes heating the calcined CZO PGM catalyst in an environment held at a temperature of greater than or equal to about 1000° C. to less than or equal to about 1100° C. for greater than or equal to about 0.5 hour to less than or equal to about 1 hour.

In another form, a method for producing a catalyst formed of ceria-zirconia (CZO) in the pyrochlore phase impregnated with at least a precious group metal (PGM) includes obtaining an impregnated CZO catalyst. The impregnated CZO catalyst is reduced is coated onto a substrate, and the impregnated CZO catalyst is reduced to form a (PGM/CZO)-pyrochlore catalyst.

In a variation, the substrate comprises cordierite.

In another variation, reducing the impregnated CZO catalyst includes heating the calcined CZO PGM catalyst in an environment held at a temperature of about 1050° C. for greater than or equal to about 0.5 hour to less than or equal to about 1 hour.

In yet another variation, the PGM includes palladium and the CZO is impregnated with the palladium at about 0.6 wt. %.

In a further variation, the PGM includes at least one of palladium, nickel, platinum, rhodium, gold, and iridium.

In a further still variation, reducing the impregnated CZO catalyst includes heating the impregnated CZO catalyst for greater than or equal to about 0.5 hour to less than or equal to about 1 hour.

In a further form, a method for producing a catalyst formed of ceria-zirconia (CZO) in the pyrochlore phase impregnated with palladium includes calcining the CZO with the palladium to form a calcined CZO palladium catalyst. The calcined CZO palladium catalyst is heated for less than or equal to about 1 hour to form a (PGM/CZO)-pyrochlore catalyst.

In a variation, the (PGM/CZO)-pyrochlore catalyst is coated onto a substrate. In other such variations, the substrate is cordierite.

In another variation, heating the calcined CZO palladium catalyst includes heating the calcined CZO palladium catalyst in an environment held at a temperature of greater than or equal to about 1000° C. to less than or equal to about 1100° C.

In a further variation, heating the calcined CZO palladium catalyst includes heating the calcined CZO palladium catalyst for greater than or equal to about 0.5 hour to less than or equal to about 1 hour.

In yet another variation, heating the calcined CZO palladium catalyst includes heating the calcined CZO palladium catalyst in an environment held at a temperature of about 1050° C. In other variations, heating the calcined CZO palladium catalyst includes heating the calcined CZO palladium catalyst for greater than or equal to about 0.5 hour to less than or equal to about 1 hour.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 6A:
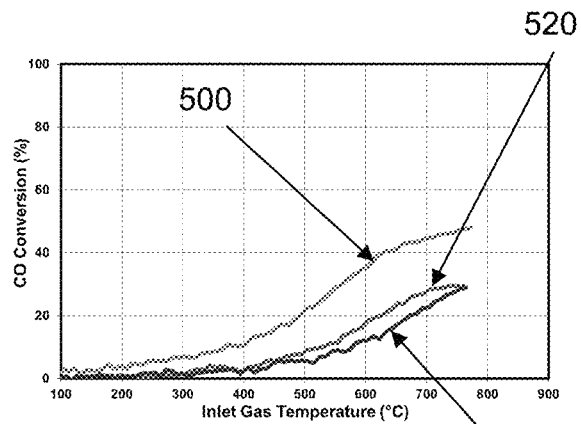
FIG. 6A is a graph illustrating the carbon monoxide conversion rate of a (PGM/CZO)-pyrochlore according to the teachings of the present disclosure against the carbon monoxide conversion rate of other CZO materials.
Figure 6B:
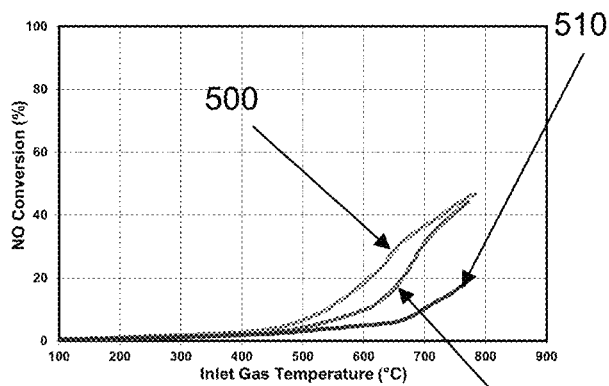
FIG. 6B is a graph illustrating the nitrogen oxide conversion rate of the (PGM/CZO)-pyrochlore according to the teachings of the present disclosure against the nitrogen oxide conversion rate of other CZO materials.
Figure 6C:
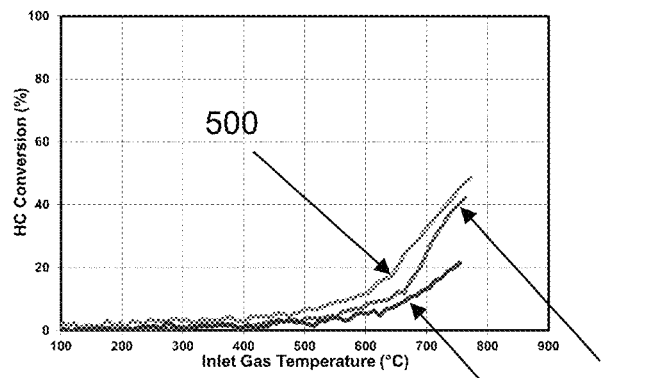
Figure 7:
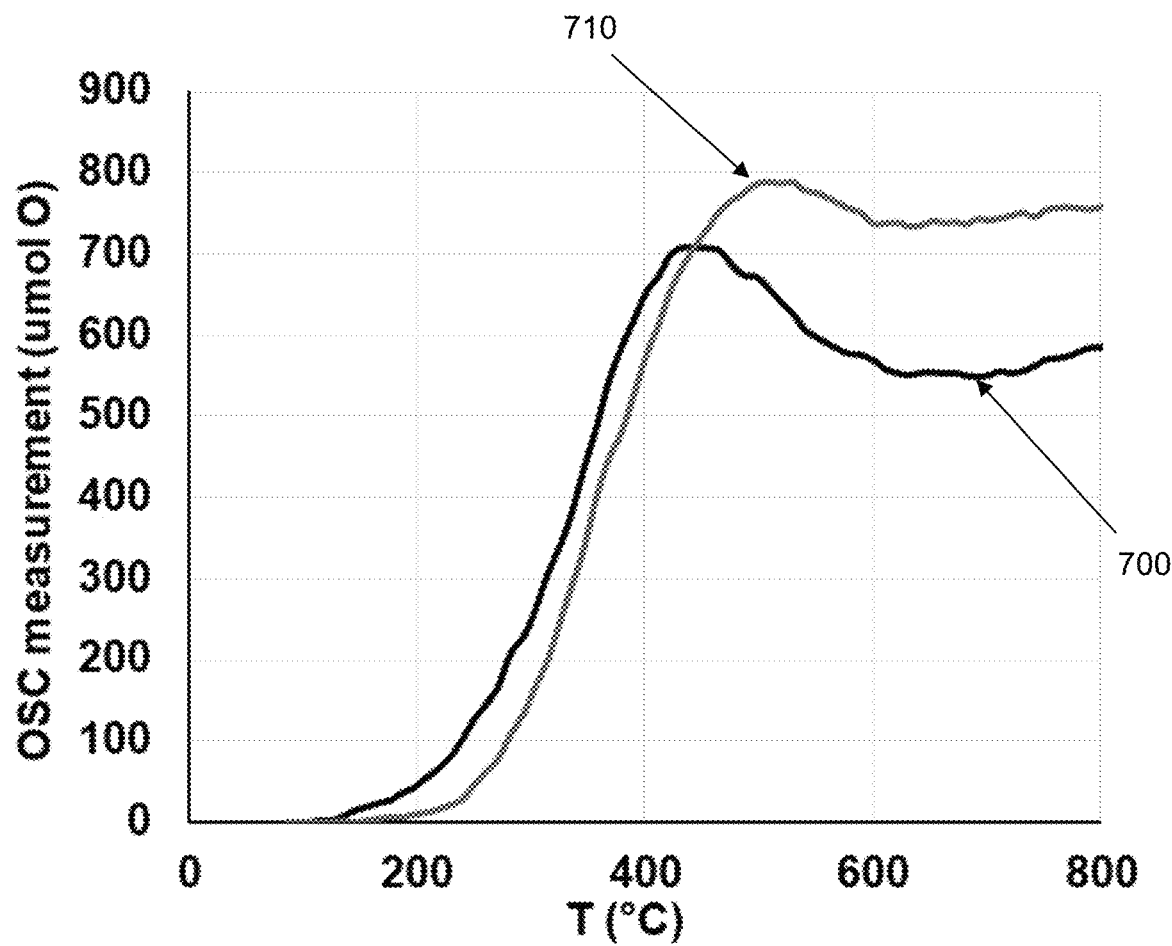

FIG. 6C is a graph illustrating the hydrocarbon conversion rate of the (PGM/CZO)-pyrochlore according to the teachings of the present disclosure against the hydrocarbon conversion rate of other CZO materials; and FIG. 7 is a graph illustrating the oxygen storage capacity of a commercially obtained calcined CZO material impregnated with rhodium and palladium against the oxygen storage capacity of the commercially obtained CZO material after reduction according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides OSC materials and more specifically catalysts formed of ceria-zirconia (CZO) in the pyrochlore phase impregnated with precious group metals (PGM) (such catalysts referred to herein as (PGM/CZO)-pyrochlore catalysts) that can reach a theoretical maximum OSC (i.e., all of the cerium ions of the (PGM/CZO)-pyrochlore catalyst are reduced from $Ce^{4+}$ to $Ce^{3+}$). In a variation, the (PGM/CZO)-pyrochlore catalysts formed according to the present disclosure can reach a maximum OSC of greater than or equal to about 90% of a theoretical maximum OSC. In a further variation, the (PGM/CZO)-pyrochlore catalysts formed according to the present disclosure can reach a maximum OSC greater than or equal to about 80% of a theoretical maximum OSC. In a further variation, the (PGM/CZO)-pyrochlore catalysts formed according to the present disclosure can reach a maximum OSC greater than or equal to about 70% of a theoretical maximum OSC. In a further variation, the (PGM/CZO)-pyrochlore catalysts formed according to the present disclosure can reach a maximum OSC greater than or equal to about 60% of a theoretical maximum OSC. Further, the (PGM/CZO)-pyrochlore catalysts according to the present disclosure also exhibit comparable, and, in some aspects, superior light-off characteristics in comparison to conventional CZO catalysts.

Suitable CZO materials have a molar ratio of cerium(IV) oxide to zirconium oxide of 1:1. In a variation, the molar ratio of cerium(IV) oxide to zirconium oxide of greater than or equal to about 0.67:1 to less than or equal to about 1.5:1 such that the CZO material is in the tetragonal phase. Further, suitable CZO materials exhibit surface areas of greater than or equal to about 80 $m^2/g$.

Suitable PGMs include palladium, nickel, platinum, rhodium, gold, iridium, and combinations thereof. According to a variation, the PGM comprises palladium.

To prepare the (PGM/CZO)-pyrochlore catalysts according to the present disclosure, a CZO material is mixed with a PGM precursor. The PGM precursor may comprise a nitrate solution, such as $Pd(NO_3)_2$ or $Ni(NO_3)_2$, acetate solutions, or tetraamine nitrate solutions, among others. In a variation, the PGM in the PGM precursor is at about 0.6 wt. %. In another variation, the PGM in the PGM precursor is at greater than or equal to about 0.1 wt. % to less than or equal to about 1 wt. %. The CZO material may be in the form of a powder or other medium such that the CZO material readily mixes with the PGM precursor. After mixing, the CZO material and the PGM precursor solution is calcined by heating the solution in an environment at a temperature of greater than or equal to about 500° C. to less than or equal to about 600° C. for greater than or equal to about 1 hour to less than or equal to about 2 hours to form a PGM/CZO catalyst.

After calcination, the PGM/CZO catalyst is reduced to form a (PGM/CZO)-pyrochlore catalyst. The (PGM/CZO)-pyrochlore catalyst optionally is then coated onto a substrate. In a variation, after calcination, the PGM/CZO catalyst is first coated onto a substrate and then reduced to form a (PGM/CZO)-pyrochlore catalyst. In a variation, the (PGM/CZO)-pyrochlore catalyst, along with fillers (e.g. alumina fibers) to provide desirable mechanical or thermal properties, is extruded to form a part for use in a catalytic converter application.

Reducing the PGM/CZO catalyst comprises heating the PGM/CZO catalyst in an environment (e.g., an oven, among others) at a temperature of about 1050° C. in a reducing atmosphere (e.g., H$_2$) for about 1 hour to form a (PGM/CZO)-pyrochlore catalyst. In variations, the PGM/CZO catalyst is reduced by heating the PGM/CZO catalyst in an environment at a temperature of greater than or equal to about 1000° C. to less than or equal to about 1100° C. for greater than or equal to about 0.5 hour to 1 hour to form the (PGM/CZO)-pyrochlore catalyst.

Coating a substrate can be comprises forming a slurry of the PGM/CZO catalyst or alternatively a slurry of the (PGM/CZO)-pyrochlore catalyst, depending on whether the PGM/CZO catalyst was previously reduced as described above, and coating the slurry over the substrate. It is further contemplated the slurry may include optional additives as desired, such as at least one of a stabilizer, binder, and water, among others.

The substrate may be comprised of a variety of materials, including ceramics and metal materials. Non-limiting examples of ceramics include cordierite, cordierite-alpha alumina, silicon nitrides, zircon mullites, silicates, and among others. Examples of metal materials include corrosion-resistant refractory metals based on stainless steel or iron.

The substrate may take on any desirable shape, such as a pellet shape, and a honeycomb shape, among others. In a form, the substrate may be a honeycomb-shaped cordierite. As used herein, a honeycomb shape is intended to refer to a monolithic structure having a plurality of passages extending therethrough. It is contemplated that coating the substrate would include coating the passages.

Figure 1:
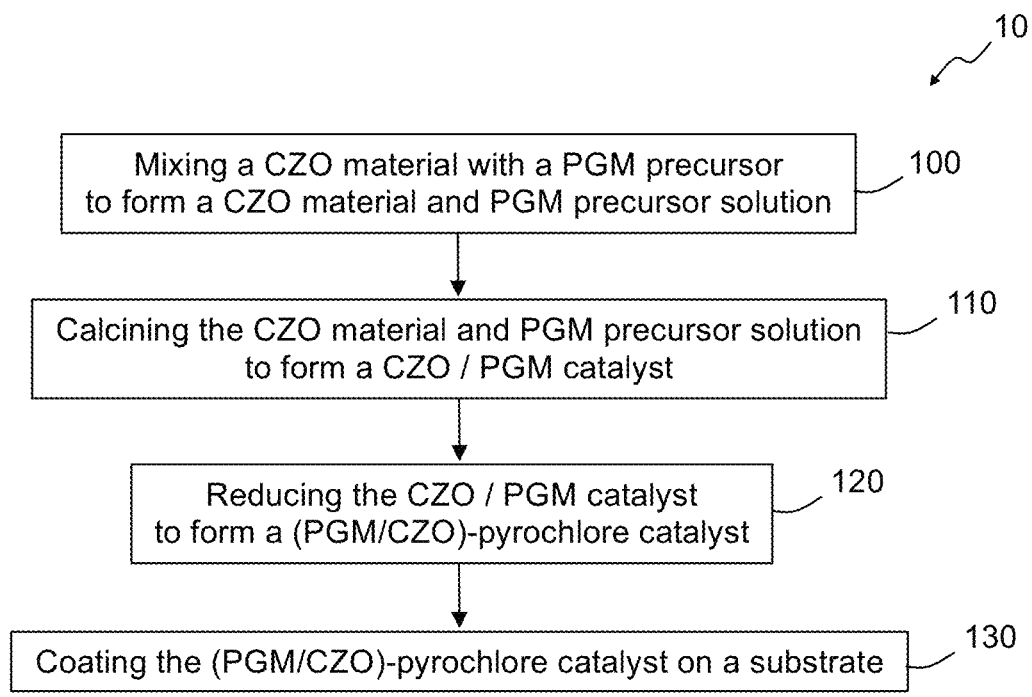
FIG. 1 is a flowchart for a method of forming a (PGM/CZO)-pyrochlore according to the teachings of the present disclosure.

Referring to FIG. 1, a flow chart for a method 10 of forming a (PGM/CZO)-pyrochlore catalyst is shown. The method includes mixing a CZO material with a PGM precursor at 100. At 110, the CZO material and PGM precursor solution is calcined to form a CZO/PGM catalyst. At 120, the CZO/PGM catalyst is reduced to form a (PGM/CZO)-pyrochlore catalyst. At 130, the (PGM/CZO)-pyrochlore is coated on a substrate.

Figure 2:
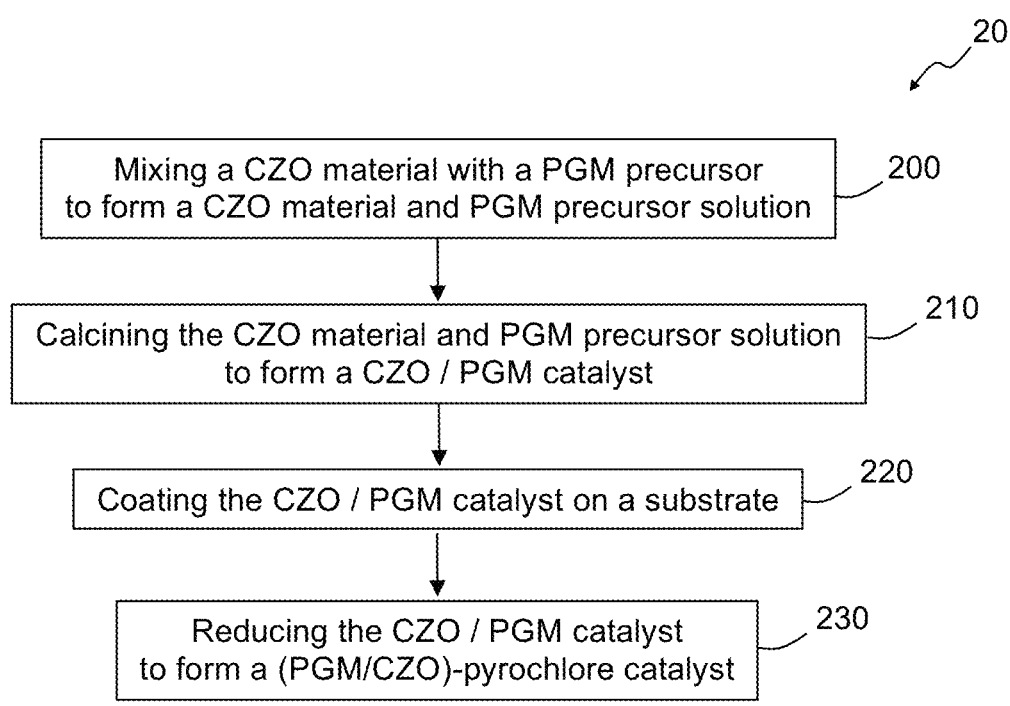
FIG. 2 is a flowchart for another method of forming a (PGM/CZO)-pyrochlore according to the teachings of the present disclosure.

Referring to FIG. 2, a flow chart for a method 20 of forming a (PGM/CZO)-pyrochlore catalyst is shown. The method includes mixing a CZO material with a PGM precursor at 100. At 210, the CZO material and PGM precursor solution is calcined to form a CZO/PGM catalyst. At 220, the CZO/PGM catalyst is coated on a substrate. At 230, the CZO/PGM catalyst is reduced to form a (PGM/CZO)-pyrochlore catalyst.

Figure 3:
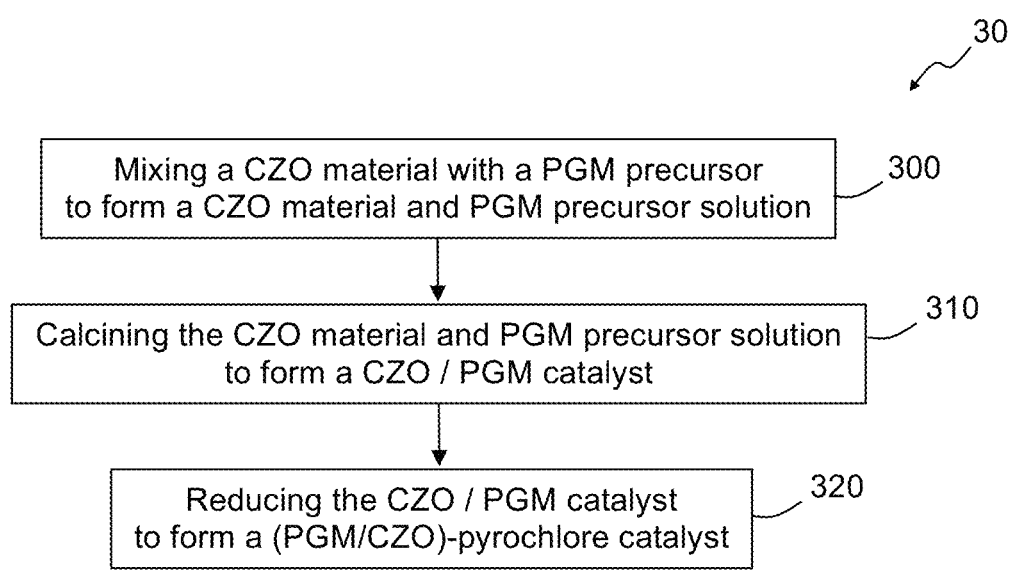
FIG. 3 is a flowchart for another method of forming a (PGM/CZO)-pyrochlore according to the teachings of the present disclosure.

Referring to FIG. 3, a flow chart for a method 30 of forming a (PGM/CZO)-pyrochlore catalyst is shown. The method includes mixing a CZO material with a PGM precursor at 100. At 310, the CZO material and PGM precursor solution is calcined to form a CZO/PGM catalyst. At 320, the CZO/PGM catalyst is reduced to form a (PGM/CZO)-pyrochlore catalyst.

Figure 4:
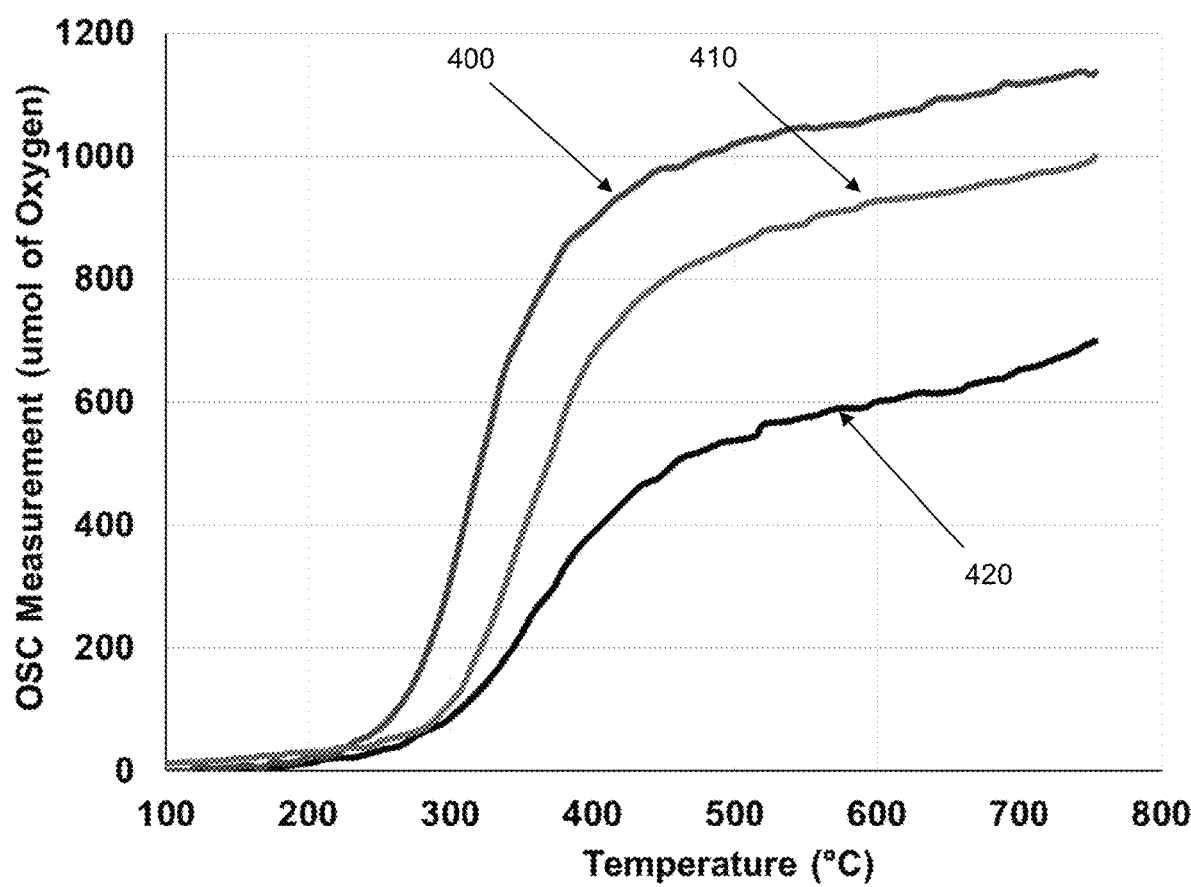
FIG. 4 is a graph illustrating oxygen storage capacity of a (PGM/CZO)-pyrochlore according to the teachings of the present disclosure against the oxygen storage capacities of other CZO materials.

The (PGM/CZO)-pyrochlore catalysts according to the present disclosure exhibit superior OSC and light-off characteristics in comparison to CZO materials that are reduced to form CZO materials in the pyrochlore phase before being impregnated with PGM, as well as CZO materials impregnated with PGM that are not reduced. Referring to FIG. 4, a graph showing OSC in μmol of oxygen as a function of temperature is shown. In each of the measurements shown, the PGM comprises palladium. The (PGM/CZO)-pyrochlore catalysts according to the present disclosure, shown as numeral 400, outperform both pyrochlore CZO materials impregnated with PGM according to conventional methods, shown as numeral 410, and non-pyrochlore CZO impregnated with PGM, shown as numeral 420. First of all, the (PGM/CZO)-pyrochlore catalysts according to the present disclosure exhibit superior OSC. Second of all, the (PGM/CZO)-pyrochlore catalysts according to the present disclosure exhibit better OSC light-off.

Figure 5:
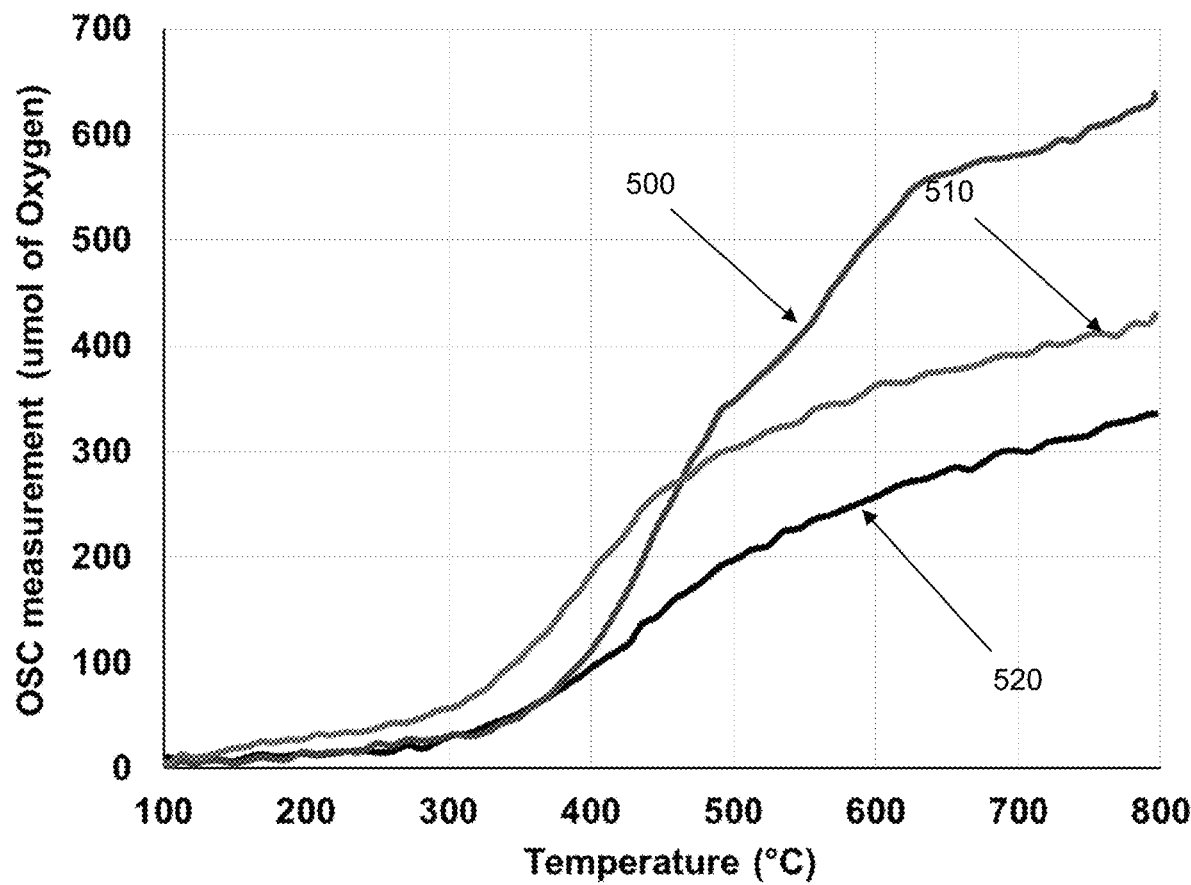
FIG. 5 is another graph illustrating oxygen storage capacity of another (PGM/CZO)-pyrochlore according to the teachings of the present disclosure against the oxygen storage capacities of other CZO materials.

Similarly, (PGM/CZO)-pyrochlore catalysts according to the present disclosure using other precious group metals besides palladium have shown superior OSC characteristics. Referring to FIG. 5, a graph showing OSC in μmol of oxygen as a function of temperature is shown. In each of the measurements shown, the PGM comprises nickel. The (PGM/CZO)-pyrochlore catalysts according to the present disclosure, shown as numeral 500, exhibit superior OSC characteristics as opposed to both pyrochlore CZO materials impregnated with PGM according to conventional methods, shown as numeral 510, and non-pyrochlore CZO materials impregnated with PGM, shown as numeral 520 in test catalytic converter systems. Further still, as is known, three-way catalytic converters involve oxidizing (1) carbon monoxide, (2) nitrogen oxide, and (3) hydrocarbons.

Referring to FIGS. 6A-6C, (PGM-CZO)-pyrochlore catalysts according to the present disclosure perform better to catalyze each of carbon monoxide, nitrogen oxide, and hydrocarbons as opposed to pyrochlore CZO materials impregnated with PGM according to conventional methods and non-pyrochlore CZO materials impregnated with PGM. As shown, the coversion percentage for carbon monoxide, nitrogen oxide, and hydrocarbons for the (PGM/CZO)-pyrochlore catalysts according to the present disclosure (500) are significantly higher, especially as the inlet gas temperature increases. It is expected similar results would be achieved with other precious group metals, such as platinum, rhodium, gold, and iridium, among others.

It is also contemplated that commercially available calcined CZO/PGM catalyst may be obtained and reduced according to the methods disclosed herein to increase its OSC. Referring to FIG. 7, a calcined CZO impregnated with 10 g/ft$^3$ rhodium and 90 g/ft$^3$ palladium, identified as numeral 700, was tested in a catalytic converter system. A calcined CZO impregnated with 10 g/ft$^3$ rhodium and 90 g/ft$^3$ palladium was reduced at about 1050° C. in 1% hydrogen atmosphere for about 1 hour to change the CZO into a pyrochlore phase. The CZO-pyrochlore impregnated with 10 g/ft$^3$ rhodium and 90 g/ft$^3$ palladium, identified as numeral 710, was also tested in a catalytic converter system. As shown, the CZO-pyrochlore impregnated with 10 g/ft$^3$ rhodium and 90 g/ft$^3$ palladium outperformed the calcined CZO impregnated with 10 g/ft$^3$ and 90 g/ft$^3$ palladium at temperatures above about 450° C.

Spatially relative terms, such as "up", "down", "side to side", "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above or below. The device may be otherwise oriented (rotated 90 degrees or at other orientations) and the spatially relative descriptors used herein interpreted accordingly.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of producing a catalyst formed of ceria-zirconia (CZO) in a pyrochlore phase impregnated with at least a precious group metal (PGM), the method comprising:
    calcining the CZO with the PGM to form a calcined CZO PGM catalyst in a first step;
    reducing the calcined CZO PGM catalyst to form a (PGM/CZO)-pyrochlore catalyst in a second step; and
    coating the (PGM/CZO)-pyrochlore catalyst onto a substrate in a third step,
    wherein the catalyst reaches a maximum oxygen storage capacity of greater than or equal to about 60% of a theoretical maximum oxygen storage capacity, and wherein the PGM comprises palladium and the CZO is calcined with the palladium at about 0.6 wt. %.

2. The method according to claim 1, wherein the substrate comprises cordierite.

3. The method according to claim 1, wherein reducing the calcined CZO PGM catalyst comprises heating the calcined CZO PGM catalyst in an environment held at a temperature of about 1050° C. for greater than or equal to about 0.5 hour to less than or equal to about 1 hour.

4. The method according to claim 1, wherein reducing the calcined CZO comprises heating the calcined CZO PGM catalyst in an environment held at a temperature of greater than or equal to about 1000° C. to less than or equal to about 1100° C. for greater than or equal to about 0.5 hour to less than or equal to about 1 hour.

5. A method of producing an oxygen storage ceria-zirconia (CZO) catalyst in a pyrochlore phase impregnated with at least a precious group metal (PGM), the method comprising:
    coating a substrate with an impregnated CZO; and
    reducing the impregnated CZO catalyst to form a (PGM/CZO)-pyrochlore catalyst,
    wherein the oxygen storage CZO catalyst reaches a maximum oxygen storage capacity of greater than or equal to about 60% of a theoretical maximum oxygen storage capacity, and wherein the PGM comprises palladium and the CZO is calcined with the palladium at about 0.6 wt. %.

6. The method according to claim 5, wherein the substrate comprises cordierite.

7. The method according to claim 5, wherein reducing the impregnated CZO catalyst comprises heating the impregnated CZO catalyst in an environment held at a temperature of about 1050° C. for greater than or equal to about 0.5 hour to less than or equal to about 1 hour.

8. The method according to claim 5, wherein reducing the impregnated CZO catalyst comprises heating the impregnated CZO catalyst for greater than or equal to about 0.5 hour to less than or equal to about 1 hour.

9. A method of producing a catalyst formed of ceria-zirconia (CZO) in a pyrochlore phase impregnated with palladium, the method comprising:
    calcining the CZO with palladium at about 0.6 wt. % to form a calcined CZO palladium catalyst; and
    heating the calcined CZO palladium catalyst for less than or equal to about 1 hour to form a (PGM/CZO)-pyrochlore catalyst,
    wherein the catalyst reaches a maximum oxygen storage capacity of greater than or equal to about 60% of a theoretical maximum oxygen storage capacity.

10. The method according to claim 9, further comprising coating the (PGM/CZO)-pyrochlore catalyst onto a substrate.

11. The method of according to claim 10, wherein the substrate comprises cordierite.

12. The method according to claim 9, wherein heating the calcined CZO palladium catalyst comprises heating the calcined CZO palladium catalyst in an environment held at a temperature of greater than or equal to about 1000° C. to less than or equal to about 1100° C.

13. The method according to claim 9, wherein heating the calcined CZO palladium catalyst comprises heating the calcined CZO palladium catalyst for greater than or equal to about 0.5 hour to less than or equal to about 1 hour.

14. The method according to claim 9, wherein heating the calcined CZO palladium catalyst comprises heating the calcined CZO palladium catalyst in an environment held at a temperature of about 1050° C.

15. The method according to claim 14, wherein heating the calcined CZO palladium catalyst comprises heating the calcined CZO palladium catalyst for greater than or equal to about 0.5 hour to less than or equal to about 1 hour.

* * * * *